US 6,628,476 B2

(12) United States Patent
Mayne

(10) Patent No.: US 6,628,476 B2
(45) Date of Patent: Sep. 30, 2003

(54) DISK DRIVE WHICH PREVENTS MISTHREADING

(75) Inventor: Douglas Mayne, Ogden, UT (US)

(73) Assignee: Iomega Corporation, San Diego, CA (US)

( * ) Notice: Subject to any disclaimer, the term of this patent is extended or adjusted under 35 U.S.C. 154(b) by 176 days.

(21) Appl. No.: 09/896,311

(22) Filed: Jun. 29, 2001

(65) Prior Publication Data

US 2003/0002221 A1 Jan. 2, 2003

(51) Int. Cl.[7] .............................................. G11B 5/016
(52) U.S. Cl. .................. 360/99.02; 360/254.1
(58) Field of Search ........................ 360/254.1, 255.9, 360/99.01, 99.05, 130.2

(56) References Cited

U.S. PATENT DOCUMENTS

| 4,445,157 A | 4/1984 | Takahashi .................. 360/133 |
| 4,553,175 A | 11/1985 | Baumeister .................. 358/310 |
| 5,469,314 A | 11/1995 | Morehouse et al. ......... 360/105 |
| 5,995,332 A | * 11/1999 | Patterson .................. 360/254.6 |
| 6,055,125 A | 4/2000 | Muse et al. ............. 360/99.06 |

* cited by examiner

Primary Examiner—A. J. Heinz
(74) Attorney, Agent, or Firm—Woodcock Washburn LLP

(57) ABSTRACT

A threader prevents misthreading of a flexible magnetic media when it is inserted into a disk drive. The threader is situated in the disk drive such that it has a height greater than a height of a lower half of a load ramp, upon which the disk driver's rotary actuator parks when it is not reading or writing to the disk. Preferably, the threader is a pliable piece of material that is ramp shaped.

10 Claims, 4 Drawing Sheets

DISK DRIVE WHICH PREVENTS MISTHREADING

The present invention relates to data storage devices, or disk drives, for recording digital information on or reading digital information from a flexible magnetic media, which is disposed within a cartridge shell, and more particularly, to an apparatus to prevent misthreading of the media during insertion into the disk drive.

BACKGROUND OF THE INVENTION

Microprocessors and supporting computer technologies are rapidly increasing in speed and computing power while decreasing in cost and size. These factors have led to the broad application of microprocessors to an array of electronic products, such as hand-held computers, digital cameras, cellular phones and the like. All of these devices have, in effect, become computers with particular application-specific attributes. For this new breed of computer products, enormous flexibility is gained by the ability to exchange data files and store computer software.

A variety of proprietary storage devices have been used in computer products. For example, hand-held computers have used integrated circuit memory cards ("memory cards") as the primary information storage media. Memory cards include memory storage elements, such as static random access memory (SRAM), or programmable and erasable non-volatile memory, such as "flash" memory. Memory cards each typically are the size of a conventional credit card and are used in portable computers in place of hard disk drives and floppy disk drives. Furthermore, memory cards enhance the significant advantages of the size, weight, and battery lifetime attributes of the portable computer and increase portability of the storage media. Because of the limited memory density attainable in each memory card, however, and the high cost of the specialized memory chips, using memory cards in hand-held computers imposes limitations not encountered in less portable computers such as conventional personal computers, which typically use more power-consuming and heavier hard and/or floppy disk drives as their primary storage data device.

More portable computer products, such as the digital camera, have employed miniature video disks as the storage media. For example, U.S. Pat. No. 4,553,175, which issued Nov. 12, 1985 to Baumeister, discloses a digital camera configured to store information on a magnetic disk. In Baumeister, a signal processor receives signals representative of a picture from a photo sensor. Those signals are recorded on a magnetic disk for later processing. Unfortunately, the video disk storage product provides limited storage capacity. For that and other reasons such as power consumption and cost, the video disk has not been used in other computer products. As a result, interchanging data from one of these digital cameras with other computer products, such as a hand-held computer, is not readily achieved.

Miniature hard disk drives also have been suggested for use in portable computer products. For example, U.S. Pat. No. 5,469,314, which issued Nov. 21, 1995 to Morehouse et al., discloses a miniature hard drive for use in portable computer applications. In Morehouse, a hard disk drive is described that is approximately 50 mm in diameter. While addressing many of the problems presented by storage requirements in portable computers, the obvious problem of removability of the storage media remained present.

Similar to a standard size cartridge, a miniature cartridge contains a flexible magnetic disk (or media) disposed within a hard outer shell. Such a standard size cartridge is disclosed in U.S. Pat. No. 4,445,157 (Takahashi). The Takahashi patent generally is directed to a disk cassette that contains a flexible magnetic disk having a center core, i.e., a hub, and an apparatus for reading digital information from and recording digital information on the flexible magnetic disk.

Apparatus for reading digital information from and recording digital information on flexible magnetic media, or disk drives, often employ rotary actuators for positioning read/write heads of the disk drive over the surfaces of the storage media, which rotates about its hub. Rotary actuator assemblies (or rotary assemblies or head stacking assemblies (HSA's)) are used to carry the heads for magnetic disk drives, CD players, and optical drive devices. A rotary assembly has a pivot on bearings about which the actuator rotates to position the heads onto the desired track of the rotating storage media. An exemplary cartridge load and eject mechanism for a drive having such a rotary assembly is disclosed in commonly assigned U.S. Pat. No. 6,055,125, which issued Apr. 25, 2000, to Muse et al. U.S. Pat. No. 6,055,125 is hereby incorporated by reference in its entirety.

The relatively small size of disk drive bays found in laptop and notebook computers, and smaller devices such as digital cameras, can place significant constraints on the designer of internal disk drives for use in such computers. Techniques that address and overcome the problems associated with these size constraints are therefore important.

A top plan view of an exemplary disk drive is shown in FIG. 1. As shown in FIG. 1, the disk drive comprises a rotary actuator assembly 10, a pivot 20 about which the actuator 10 rotates and the platform 22 on which the storage media rests.

FIG. 2 shows an enlarged cross-sectional view of the disk drive of FIG. 1 across line II—II. As shown in FIG. 2, the disk drive also contains a load ramp 30, which is known in the art.

FIG. 3 shows a top plan view of the disk drive of FIG. 1 when the rotary actuator 10 is parked or situated on the load ramp 30. The actuator 10 is in this position when the actuator 10 is not accessing data from or recording data on the flexible media.

FIG. 4 shows an enlarged cross-sectional view of the disk drive of FIG. 3 across line IV—IV. As shown in FIG. 4, the rotary actuator 10 is positioned (or "parked") in back of the load ramp 30 (away from the media). Also, the rotary actuator 10 has two arms 12 and 14, which serve as a suspension for the read/write heads, which themselves are situated on the distal ends of the arms 12 and 14.

As also shown in FIGS. 3 and 4, the load ramp 30 has two ramp-shaped halves 32 and 34. This load ramp 30 is referred to as a scissors-type load ramp. When the actuator 10 is rotating away from the flexible storage media to its parked position, the halves 32 and 34 of the load ramp 30 are in a closed position, as shown in FIG. 2. When the actuator 10 is rotating into its parked position, the upper arm 12 of the actuator 10 is guided over the upper half 32 of the load ramp 30. Similarly, the lower arm 14 of the actuator 10 is guided under the lower half 34 of the load ramp 30.

When the rotary actuator 10 is in its parked position, as shown in FIG. 4, the halves 32 and 34 of load ramp are in an open position. When a disk cartridge is inserted into the drive, it is designed such that the flexible media threads between the halves 32 and 34 of the load ramp 30, as they are positioned as shown in FIG. 4.

During insertion of the cartridge, however, a problem can arise when the media misthreads below the lower half 34 of the ramp 30. This problem presents a minor failure in that every time it occurs, the user must eject the cartridge and reinsert it because in the misthreaded state, the drive cannot read from or record to the media.

Additionally, misthreading presents a major failure in that if the media misthreads, the heads of the actuator 10 can stick together. Further, in some cases when the heads stick together and as the actuator 10 rotates toward its parked position, the arms 12 and 14 of the actuator become stuck between the halves 32 and 34 of the load ramp 30, i.e., instead of riding on the outside of the ramp 30. When this happens, the cartridge-eject mechanism in some disk drives cannot operate. At that point, the drive must be serviced to remove the cartridge.

It is, therefore, desirable to provide a disk drive that prevents misthreading of the flexible magnetic media during insertion into the disk drive.

SUMMARY OF THE INVENTION

An apparatus to prevent misthreading of a flexible magnetic media when it is inserted into a disk drive is disclosed. In addition, a disk drive utilizing the apparatus of the present invention, referred to herein as a threader, is disclosed. The disk drive records digital information on or reading digital information from a flexible magnetic media. The disk drive comprises a hub for receiving the media which is disposed within a cartridge shell, an actuator for positioning read/write heads over surfaces of the flexible media, a load ramp upon which the actuator is situated when the actuator is not accessing data from or recording data on the media, and the threader to prevent misthreading of the media during insertion of the media into the disk drive.

The threader is situated in the disk drive such that it has a height greater than a height of a lower half of the load ramp. In addition, the threader preferably is a pliable piece of material that is ramp shaped.

DETAILED DESCRIPTION OF THE PREFERRED EMBODIMENTS

Figure 1:
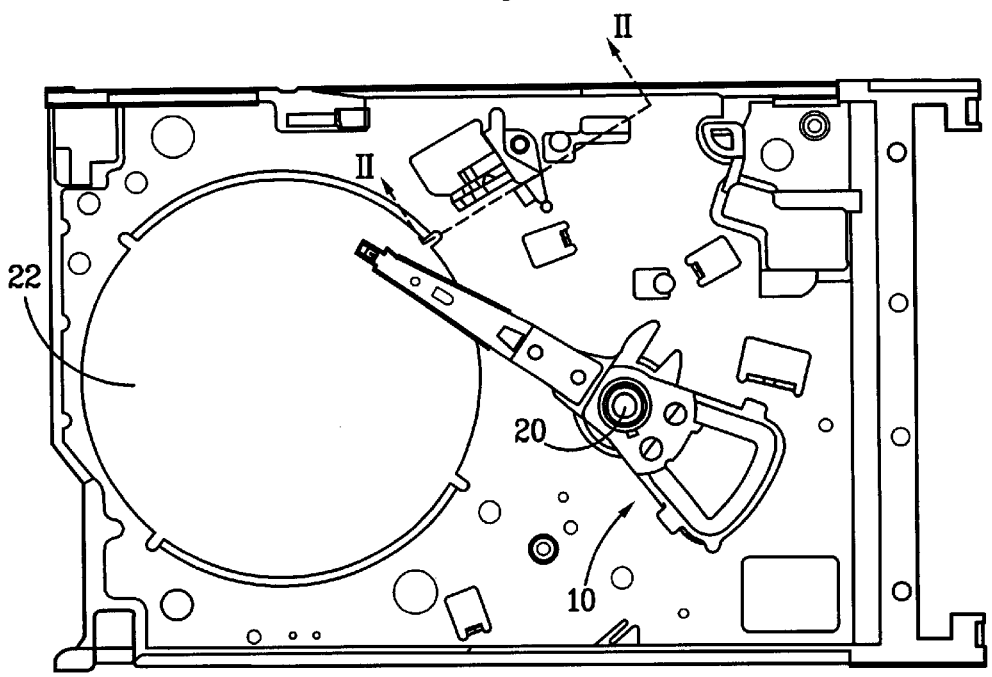
FIG. 1 is a top plan view of an exemplary disk drive.
Figure 2:
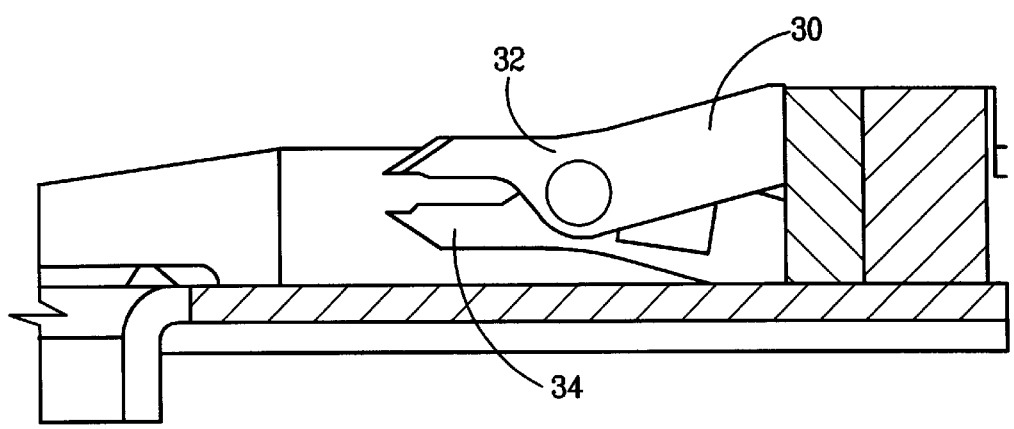
FIG. 2 is an enlarged cross-sectional view of the disk drive of FIG. 1 across line II—II.
Figure 3:
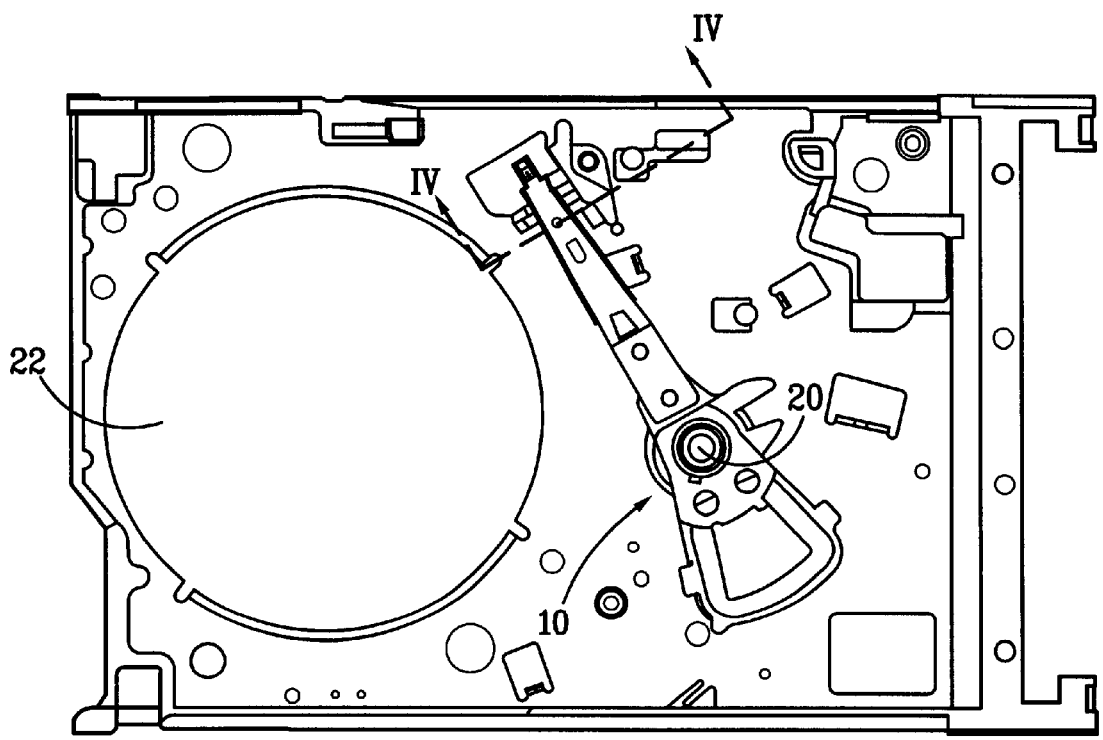
FIG. 3 is a top plan view of the disk drive of FIG. 1 when the rotary actuator 10 is parked.
Figure 4:
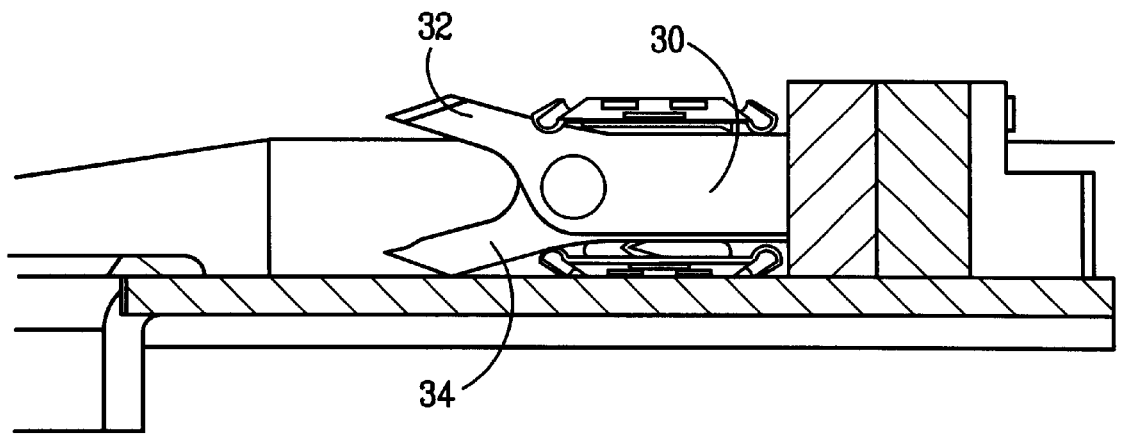
FIG. 4 shows an enlarged cross-sectional view of the disk drive of FIG. 3 across line IV—IV.
Figure 5:
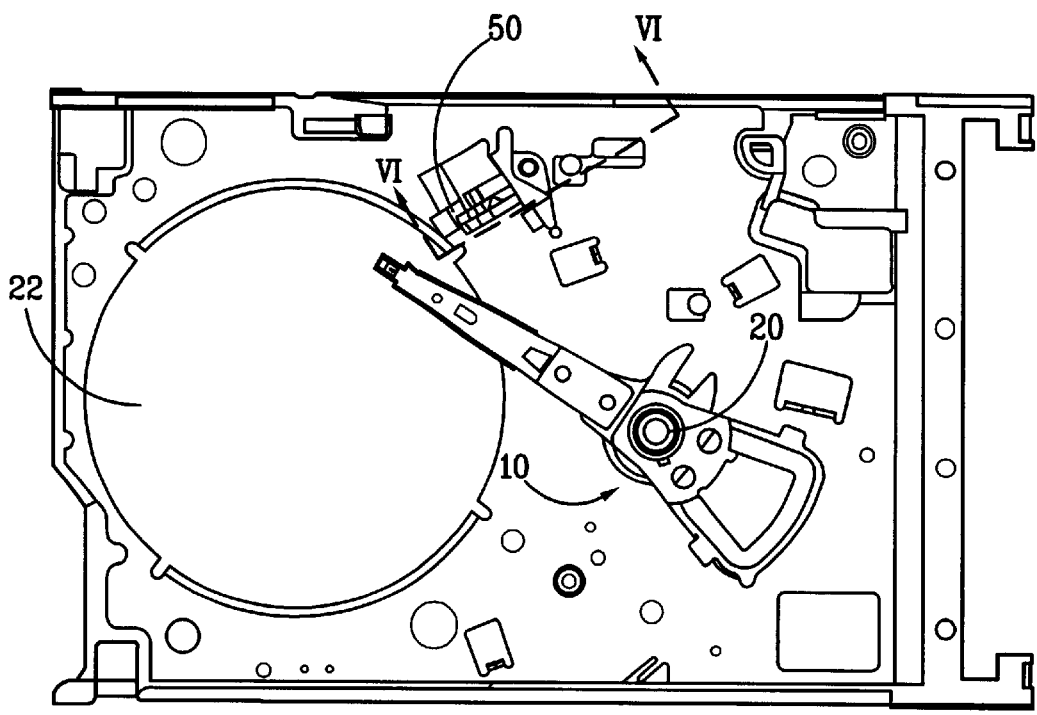
FIG. 5 is a top plan view of the disk drive of FIG. 1 in conjunction with a threader of the present invention.
Figure 6:
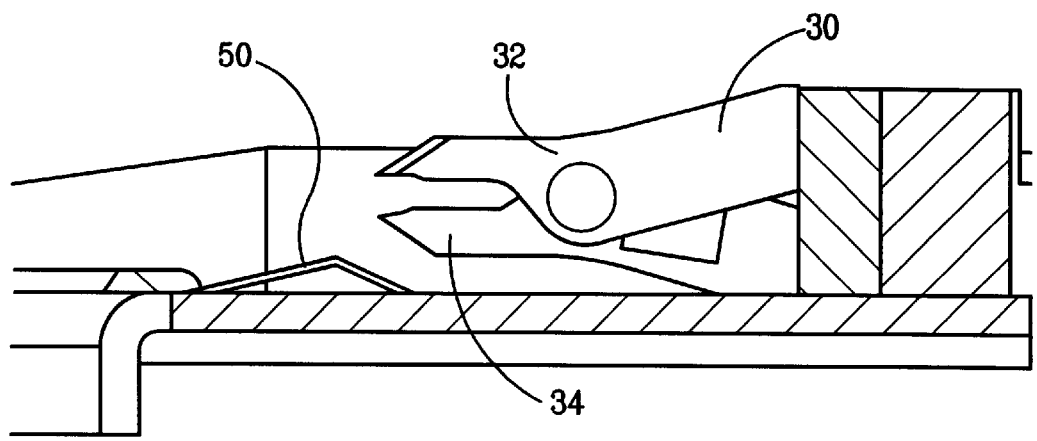
FIG. 6 is an enlarged cross-sectional view of the disk drive of FIG. 5 across line VI—VI.
Figure 7:
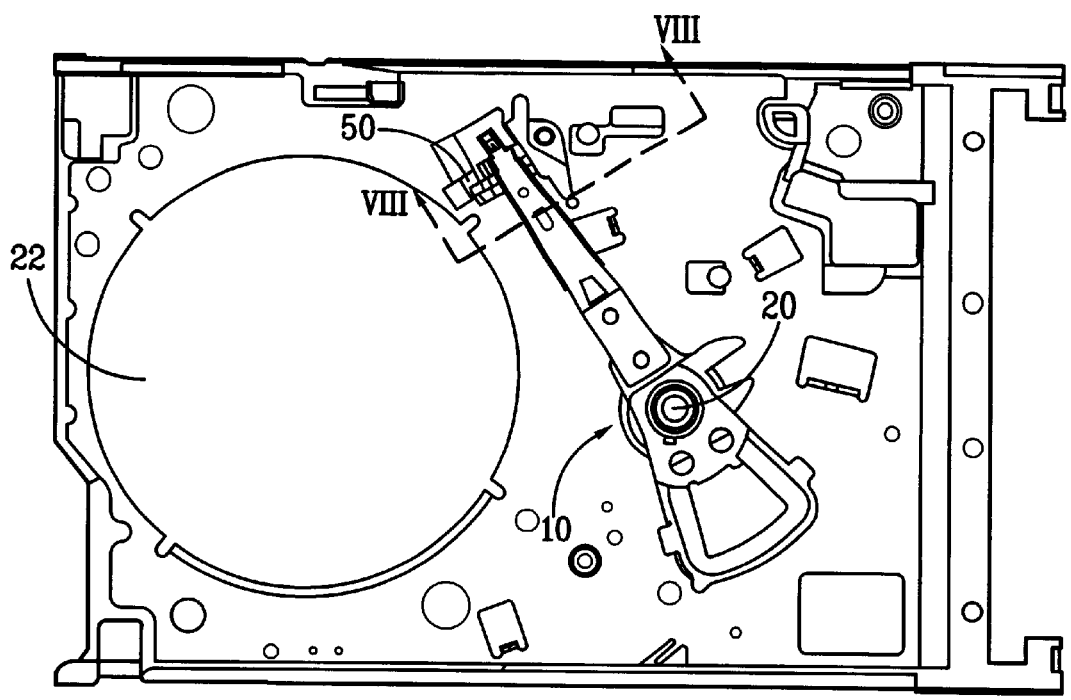
FIG. 7 is a top plan view of the disk drive of FIG. 5 when the rotary actuator 10 is parked.
Figure 8:
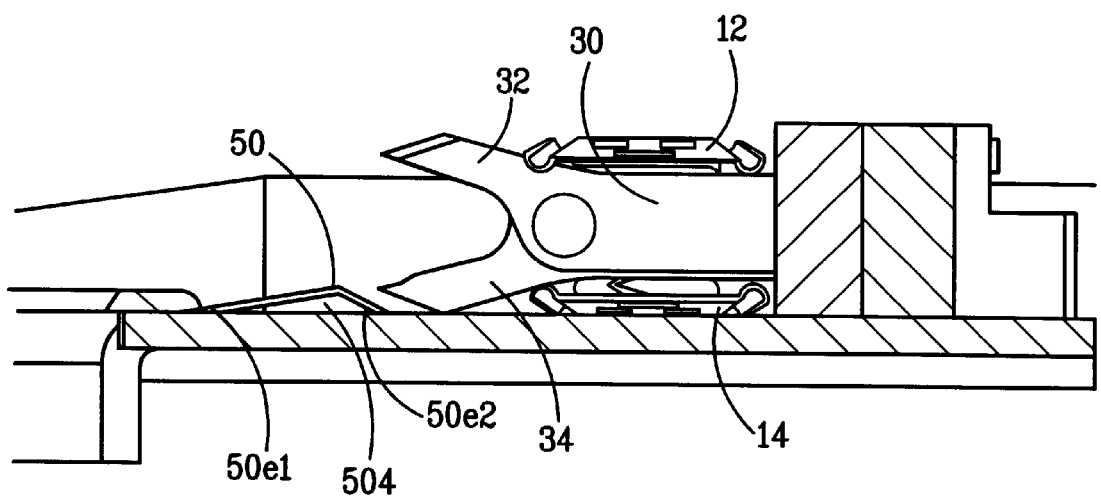
FIG. 8 shows an enlarged cross-sectional view of the disk drive of FIG. 7 across line VIII—VIII.

Referring to the drawings, FIG. 5 shows a top plan view of the disk drive of FIG. 1 in conjunction with a threader 50 according to the present invention. FIG. 6 shows an enlarged cross-sectional view of the disk drive of FIG. 5 in cooperation with a threader 50 according to the present invention. FIG. 7 shows a top plan view of the disk drive of FIG. 5 when the rotary actuator 10 is parked. FIG. 8 shows an enlarged cross-sectional view of the disk drive of FIG. 7 across line VIII—VIII.

Preferably, the threader 50 is a pliable (or compliant) element or piece of material that is attached only at the ends 50e1 and 50e2, i.e., having a hollow underside 50u (FIG. 8). Mylar™ is the preferred material, and more preferably, Mylar™ having a thickness of 0.05 mm. As shown in FIGS. 6 and 8, the threader 50 preferably is ramp-shaped. As shown in FIGS. 5 and 7, the threader preferably has a rectangular or square shape in a top plan view. For a disk drive having a media of approximately 46 mm. in diameter, a preferred height of a threader is in the range of approximately 0.5 mm. and approximately 1.5 mm., and more preferably is approximately 0.75 mm. In addition, the size of a preferred threader for such a disk drive is approximately 4 mm. by 4 mm. Further, the level of compliance for a preferred threader is sufficient to guide the disk without causing damage to either the disk or the actuator 10.

As shown in FIG. 8, when the actuator 10 is parked and the media is inserted into the drive, the threader 50 has a height greater than that of the lower half 34 of the load ramp 30. Thus, the threader 50 prevents the media from misthreading by guiding the media between the two halves 32 and 34 of the load ramp 30. In this way, the threader 50 does not permit the media to pass below the lower half 34 of the load ramp 30. In this case the media is more compliant then the threader 50 and the media will bend up the ramp of the threader 50 to thread between the two halves 32 and 34 of the load ramp.

As the actuator 10 moves from a parked position and begins to load onto the media, the upper and lower halves 32 and 34 of the load ramp 30 pivot about the load ramp pin and move closer to the media. The tip of the lower half of the load ramp 34 moves from a position below the threader 50 (FIG. 8) to a position above the threader 50 (FIG. 6). This creates space between the lower half of the load ramp 34 and the threader 50 to allow the lower arm of the actuator 14 to pass between the two. The threader 50 is sufficiently compliant so that as the actuator 10 moves from a parked position onto the media, if the lower arm 14 of the actuator 10 hits the threader 50, the arm 14 will move the threader 50 out of the way without damaging the arm 14. It is important to protect the actuator arms 12 and 14 because if they are damaged it will hinder the reading and writing capability of the drive.

It is to be understood that even though numerous characteristics and advantages of the present invention have been set forth in the foregoing description, together with details of the structure and function of the invention, the disclosure is illustrative only. Accordingly, changes may be made in detail, especially in matters of shape, size and arrangement of parts within the principles of the invention to the full extent indicated by the broad general meaning of the terms in which the appended claims are expressed.

What is claimed is:

1. A disk drive for recording digital information on or reading digital information from a flexible magnetic media, the disk drive comprising:

a hub for receiving the media which is disposed within a cartridge shell;

read/write heads for recording digital information on or reading digital information from the media;

an actuator for positioning said read/write heads over surfaces of the flexible media;

a load ramp upon which said actuator is situated when the actuator is not accessing data from or recording data on the media, said load ramp having a lower half and an upper half; and a threader to prevent misthreading of the media during insertion of the media into the disk drive, said threader preventing misthreading of the media below the lower half of the load ramp.

2. The disk drive of claim 1, wherein said threader is situated in the disk drive such that it has a height greater than a height of the lower half of the load ramp.

3. The disk drive of claim 2, wherein said threader is a pliable piece of material.

4. The disk drive of claim 3, wherein said threader is ramp shaped.

5. The disk drive of claim 4, wherein said threader has a rectangular shape in a top plan view.

6. A threader to prevent misthreading of a flexible magnetic media when it is inserted into a disk drive, the disk drive having read/write heads for recording digital information on or reading digital information from a flexible magnetic media, the actuator positioning the read/write heads over surfaces of the flexible media, the disk drive further having a load ramp upon which the actuator is situated when the actuator is not accessing data from or recording data on the media, the load ramp having a lower half and an upper half, wherein the threader prevents misthreading of the media below the lower half of the load ramp.

7. The threader of claim 6, wherein the threader is situated in the disk drive such that it has a height greater than a height of the lower half of the load ramp.

8. The actuator of claim 7, wherein the threader is a pliable piece of material.

9. The actuator of claim 8, wherein the threader is ramp shaped.

10. The actuator of claim 9, wherein the threader has a rectangular shape in a top plan view.

* * * * *